United States Patent
Donnelly et al.

(10) Patent No.: US 6,886,451 B2
(45) Date of Patent: May 3, 2005

(54) ELECTRICAL BEVERAGE MAKING APPARATUS

(75) Inventors: Vernon James Donnelly, Braddan (GB); Michael James Scott, Port St. Mary (GB)

(73) Assignee: Strix Limited (GB)

( * ) Notice: Subject to any disclaimer, the term of this patent is extended or adjusted under 35 U.S.C. 154(b) by 0 days.

(21) Appl. No.: 10/199,265

(22) Filed: Jul. 18, 2002

(65) Prior Publication Data

US 2003/0015099 A1 Jan. 23, 2003

(30) Foreign Application Priority Data

Jul. 20, 2001 (GB) .............................................. 0117732

(51) Int. Cl.[7] .................................................. A47J 31/00
(52) U.S. Cl. .............................. 99/281; 99/292; 99/303
(58) Field of Search ........................ 99/280, 281, 292, 99/291, 308, 303, 309, 310

(56) References Cited

U.S. PATENT DOCUMENTS

| | | |
|---|---|---|
| 2,287,571 A | 6/1942 | Purpura |
| 2,690,709 A * | 10/1954 | Farr et al. ..................... 99/281 |
| 2,785,276 A | 3/1957 | Punzak |
| 3,174,424 A | 3/1965 | Serio |
| 4,147,925 A | 4/1979 | Belinkoff |
| 6,178,874 B1 * | 1/2001 | Joergensen ................... 99/281 |

FOREIGN PATENT DOCUMENTS

| | | |
|---|---|---|
| EP | 0 292 649 | 2/1988 |
| EP | 0951853 A1 | 10/1999 |
| EP | 1238615 A3 | 10/2002 |
| GB | 2 356 337 A | 5/2001 |
| WO | WO 95/34187 | 12/1995 |
| WO | WO 00/30514 | 6/2000 |

* cited by examiner

*Primary Examiner*—Reginald L. Alexander
(74) *Attorney, Agent, or Firm*—O'Shea, Getz & Kosakowski, P.C.

(57) ABSTRACT

A beverage maker 2 comprises a first chamber 4, a second chamber 6 arranged on top of said first chamber 4, with a tube 8 extending down from said second chamber 6 into said first chamber 4 for transferring liquid between the two chambers. The base of the first chamber 4 has a first region 26 at least a portion of which is arranged to boil dry and a second region 28 which is arranged to retain a quantity of liquid after the first region 26 boils dry. The first region 26 is separated from the second region 28 by a wall 30. The underside of the base of the first chamber 26 is provided with one or more sheathed heating elements 32 arranged below the first region 26 of the base and also with a heat transfer member 20 which extends between the first and said second regions of the base. A thermal control 24 has a sensor arranged to detect when the first region of the base boils dry so as to interrupt the power supply to or reduce the heating output of the heating apparatus.

37 Claims, 5 Drawing Sheets

ELECTRICAL BEVERAGE MAKING APPARATUS

CROSS REFERENCE TO RELATED APPLICATION

This application is entitled under 35 U.S.C. §119 to the benefit of, and hereby incorporates by reference essential subject matter disclosed in, United Kingdom Patent Application No. 0117732.8 filed 20 Jul. 2001.

BACKGROUND OF THE INVENTION

1. Technical Field

The present invention relates to electrical beverage makers, and is particularly, although not exclusively, applicable to electric coffee makers.

2. Background Information

The type of electric beverage maker with which the invention is broadly concerned is exemplified in the Applicant's WO 00/30514, and comprises, a first chamber for receiving a liquid to be heated. A second chamber is arranged on top of this first chamber, and receives the e.g. coffee grounds. A fluid transfer pipe extends between the first and the second chambers such that they are in fluid communication with one another.

In operation, liquid placed in the first chamber is heated by an electric heater associated with the base of the chamber. As the temperature of the liquid rises, the pressure in that chamber increases, until the liquid is forced to rise up the liquid transfer tube into the second chamber, where it infuses with the grounds.

After a time, the level of the liquid in the first chamber drops to the extent that a portion of the base becomes exposed. In the absence of any liquid to cool the base or heater in that region, the temperature of the base or heater rises rapidly, causing a thermally sensitive control associated with the base to operate and reduce or interrupt the power supply to the heater.

The temperature of the first chamber then begins to decrease and steam begins to condense on the inside of the chamber. A partial vacuum is formed in the first chamber causing the infused beverage to be sucked back from the second chamber down the liquid transfer tube into the first chamber.

Although the arrangements of WO 00/30514 may be implemented using any type of electric heater, the application describes a number of specific arrangements which are particularly suitable for use in connection with a thick film heater. The Applicants have now developed certain further modifications to the apparatus which are specifically adapted for use in conjunction with sheathed element heaters.

DISCLOSURE OF THE INVENTION

According to a first aspect, the present invention therefore provides a beverage maker comprising:
- a first chamber;
- a second chamber arranged on top of said first chamber;
- a tube extending down from said second chamber into said first chamber for transferring liquid between the two chambers;
- the base of said first chamber comprising a first region at least a portion of which is arranged to boil dry and a second region which is arranged to retain a quantity of liquid after said first region boils dry, the first region being separated from the second region by a wall;
- the underside of the base of said first chamber being provided with electric heating means comprising one or more sheathed heating elements arranged below said first region of the base and further being provided with a heat transfer member which extends between said first and said second region of the base; and further comprising a thermally sensitive control comprising a thermal sensor arranged to detect when said first region of the base boils dry and to interrupt the power supply to or reduce the heating output of the heating means.

In accordance with the present invention, the base of the first chamber therefore comprises two regions: a first region which is arranged to boil dry, and a second which retains a quantity of liquid after the thermal control detects the boiling dry of the first region, and acts to interrupt the power supply to or reduce the heating output of the heater. The two regions are separated from each other by a wall.

Although the main heating ceases on operation of the control when the first region boils dry, the heat transfer member will subsequently act to draw residual heat away from the heater and the first region of the base and towards the liquid retained by the second region. This allows the reservoir of liquid retained by the second region to act as a "heat sink" for the heat stored in the first region of the base after it has boiled dry. This arrangement is effective in reducing the likelihood of the infused beverage being "burned" when it comes into contact with the base on returning from the second chamber. Such "burning" can result in localised boiling of the beverage, which is detrimental to the taste of the infused beverage, especially when the beverage is coffee.

It will also be appreciated that the transfer of residual heat into the second region will heat the liquid in this region. This, to some extent, results in the production of vapour to maintain the pressure in the lower chamber for a time after operation of the control, reducing the risk of liquid being drawn back down the transfer tube from the second chamber before it has infused for a sufficient time.

Preferably, the wall between the two base regions is a raised wall such that liquid may not flow from the first region to the second region. This facilitates manufacture, as the base can then be made generally planar. The base may then be formed, for example, by pressing. However, the second region may, alternatively, be defined as a well.

The wall may be of any suitable configuration provided that it provides two distinct regions. The wall may define the two regions either alone or together with the walls of the base. For example, a U- or C-shaped wall may abut a sidewall of the base to define the second region. Preferably, however, the wall is spaced completely inwardly from the edge of the base. In this case the first region will preferably lie outwardly of and surround the second region. In a particularly preferred arrangement the two regions are provided by an annular wall encircling the central portion of the base to define the second region. Preferably the wall defines a circular second region.

In order to produce a compact arrangement, the lower end of the transfer tube preferably opens into the second region of the base.

The heat transfer member preferably extends over a substantial area of the base, and preferably over substantially the entire first region.

It may comprise any suitable thermally conductive material such as aluminum or copper and most preferably is a substantially flat plate which is suitably attached to the base for example by brazing.

The sheathed heating element is preferably mounted to the heat transfer member, for example by soldering or brazing, and most preferably extends around the periphery of the heat transfer member. The heating element can also be cast into a cast thermal conduction member, for example an aluminum die cast member.

In certain embodiments of the invention the base and the thermal transfer member may be integrated, for example being provided by a cast member of aluminum or like thermally conductive material. In such cases the sheathed heating element may also be suitably embedded or cast into the integrated member.

The thermal sensor of the control is preferably a bimetallic actuator arranged in good thermal contact with the heat transfer member. In the preferred embodiment, a pair of spaced apart actuators are used. A control embodying such actuators and suitable for use in the present invention would be one of the Applicant's U18 series of controls, the principles of operation of which are described in the Applicant's WO 95/34187.

In order to achieve a rapid switch off when the first region boils dry, and thereby avoid unnecessary excess heat entering the base, preferably the thermal sensor is arranged to be close to the heating element. In the preferred arrangement the heat transfer member is provided with heat flow management means around the mounting location for the sensor such that the sensor is heated preferentially by the heater. Such means may comprise one or more grooves or slots provided around selected portions of the mounting location away from the heater.

The apparatus preferably further comprises means to keep the infused beverage warm once it has returned to the first chamber. This may be achieved for example by means of a keep warm element which is separate from the main heating element. The resistance of the keep warm element would typically be around an order of magnitude greater than that of the main element, and should be of such a level as not to cause the infused beverage to boil. Preferably the keep warm heating mean is mounted to the heat transfer member.

In a preferred arrangement the keep warm heating means comprises an additional sheathed element of an appropriate power level. In the case that the main heating element is mounted to the periphery of the base, the keep warm element may simply be provided by means of a second element arranged concentrically with the main heating element.

Alternatively, the keep warm element may comprise a thick film type heater, such as a ceramic heater. In one embodiment, a plurality of ceramic heaters may be provided at spaced locations across the base of the first chamber so as to provide a more uniform heating effect, and further reduce the risk of localised boiling of the infused beverage.

The keep warm element is preferably energised continually after operation of the control so as to avoid the need for a separate themostatic control, although such a control may be provided, if desired.

As stated above, in the preferred embodiment the control employs two thermally sensitive actuators, for example arranged in a control as disclosed in WO 95/34187. In arrangements with keep warm elements, preferably one actuator is arranged to sense boiling dry of the first region in order to switch out or down the main heating element, while the other is arranged to sense severe overheating of the base and thereafter de-energise the keep warm heating means. This can be achieved for example by placing one actuator nearer the heating element so that it will always sense boiling dry first, and placing the other further away so that it will not experience as high a temperature, except in a severe overheat situation. An alternative arrangement would be to use actuators with different operating temperatures.

From a further broad aspect the invention provides a beverage maker having main heating means and keep warm heating means comprising a control having a first actuator for sensing boiling dry of a region of the beverage maker and thereupon discontinuing or reducing the power supply to the main heating means, and a second actuator arranged to sense severe overheating of the beverage maker and thereupon also discontinuing or reducing the power supply to the keep warm heating means.

The infusion time will principally be determined by the time required for the first region of the base to boil dry and the control to operate. This time will depend upon the quantity of liquid present in the first region, and hence upon relative proportions of the base covered by the respective first and second regions and the height of the wall defining them. The area and depth of the second region may therefore be determined empirically to arrive at a desired infusion time.

One way in which the infusion time could be varied would be selectively to displace a variable volume of water from the first region. This may be achieved by, for example, providing a displacement member which is movable into the first region by varying amounts to displace varying amounts of water.

This is a novel arrangement in its own right, so from a further aspect the invention provides a beverage maker comprising:

a first chamber;
a second chamber arranged on top of said first chamber;
a tube extending down from said second chamber into said first chamber for transferring liquid between the two chambers;
the base of said first chamber comprising a first region at least a portion of which is arranged to boil dry in use;
and further comprising a displacement device displaceable into said first region so to displace water therefrom.

The displacement device may be mounted in any convenient location. In a preferred arrangement, however, the displaceable member is mounted on the transfer tube. Preferably it comprises a collar mounted around the transfer tube.

Suitable means may be provided on the tube and/or collar to retain the collar in one or more desired positions. For example the collar may clip into selected positions on the tube. Alternatively the tube and collar may be screw threaded, for example.

A further way in which the infusion time could be varied, in addition to, or as an alternative to the above arrangements, would be to provide an additional low powered heater which heats the second region of the base after the first region has boiled dry. Such a heater would act to complement the effect of the heat transfer member to heat the retained liquid and generate sufficient vapour to maintain the pressure in the first chamber preventing the return of the beverage from the second chamber. The infusion time would then be ended by switching off the additional heater after a predetermined time but before the region boils dry.

In this case, the infusion time could be adjusted by varying the time for which the heater is energised.

BRIEF DESCRIPTION OF THE DRAWINGS

Some preferred embodiments of the invention will now be described by way of example only and with reference to the accompanying drawings in which.

DETAILED DESCRIPTION OF THE INVENTION

Figure 1:
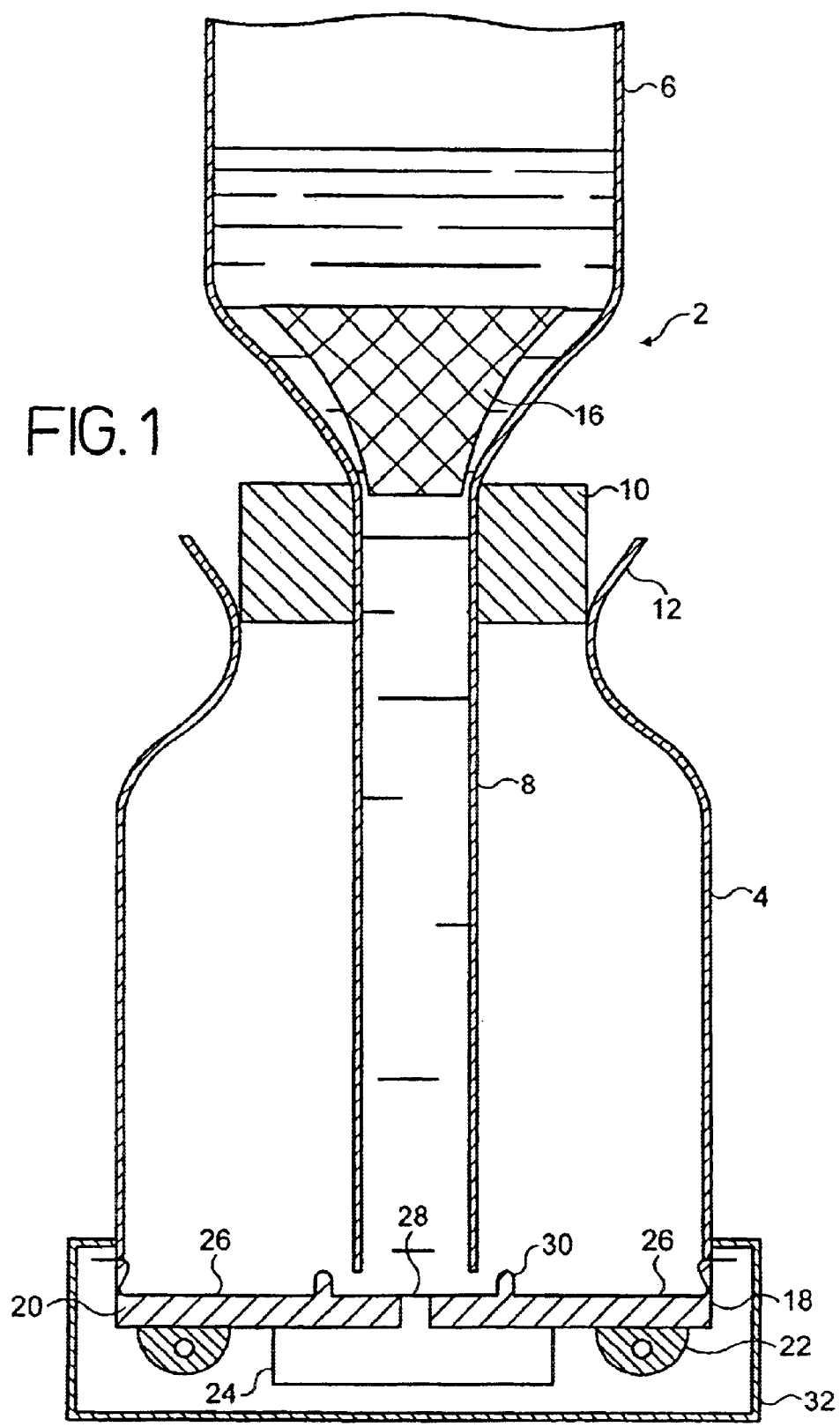
FIG. 1 is a schematic diagram showing a cross-section through an electric beverage maker in accordance with an embodiment of the present invention.

With reference to FIG. 1, a coffee making appliance 2 generally comprises a first, lower, water-receiving chamber 4 and a second, upper, coffee-receiving chamber 6. A liquid transfer tube 8 extends between the upper chamber 6 and the lower chamber 4 so that they are in fluid communication with one another. The upper chamber 6 is supported on the lower chamber 4 by a sealing bung 10 which is mounted in a spout 12 of the lower chamber 4. The bung 10 is provided with a central bore for receiving the tube 8. A filter 16 is supported in the lower part of the upper chamber 6 and permits heated water to enter the upper chamber 6 from the lower chamber 4 and subsequently allows infused beverage to enter the lower chamber 4 from the upper chamber while retaining coffee grounds.

As shown schematically in FIG. 1, the lower chamber 4 has a base 18. The base 18 is of a relatively low conductivity material, for example stainless steel, and in this embodiment is formed as a stainless steel pressed plate about 0.5–1 mm thick.

A heat transfer member 20 in the form of an aluminum or aluminum alloy plate is attached to the underside, of the base 18. The heat transfer member 20 has a higher thermal conductivity than the base 18. A sheathed heating element 22 is suitably mounted to the heat transfer member 20 and a thermally sensitive control unit 24 is mounted to the central portion of the heat transfer plate 20. A cover 32 is provided to enclose the heating element 22 and control unit 24.

Figure 2:
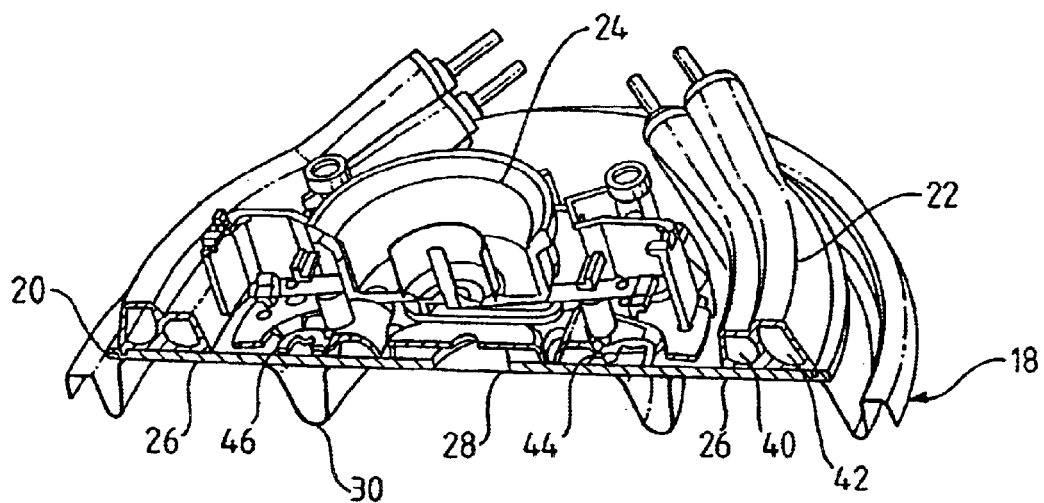
FIG. 2 is a cross-sectional view through a first embodiment of the invention.
Figure 3:
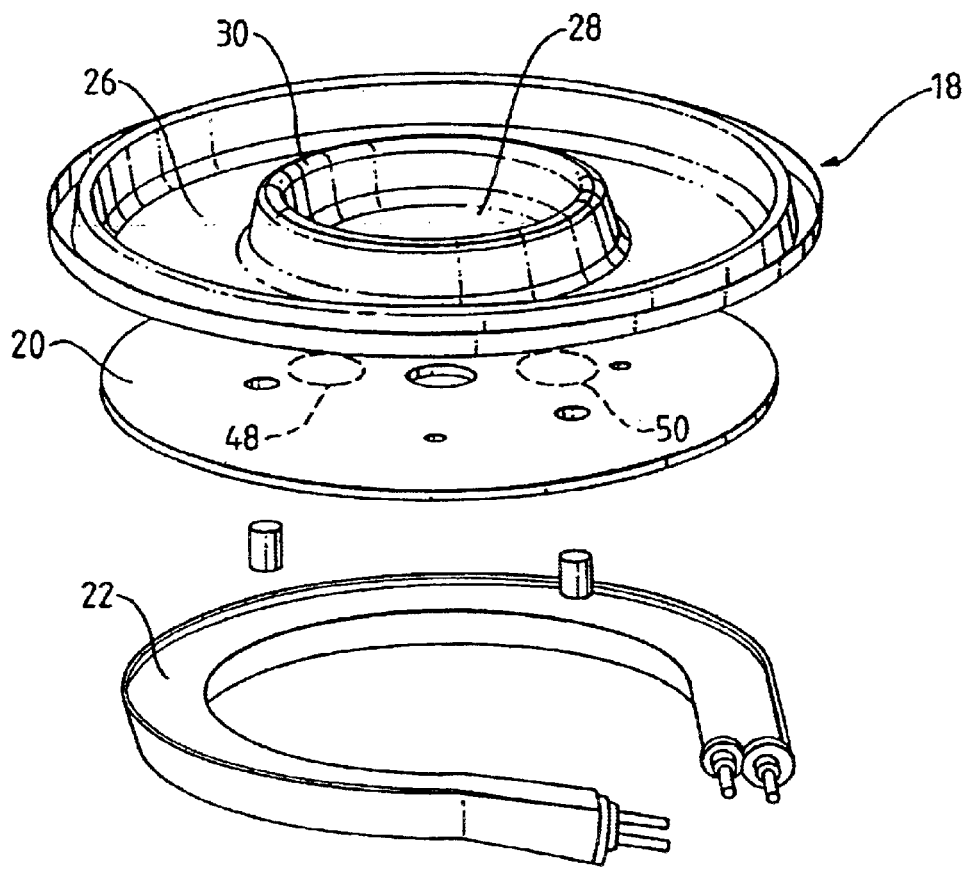
FIG. 3 is an exploded view of components of FIG. 2, but with the control omitted for clarity.
Figure 4:
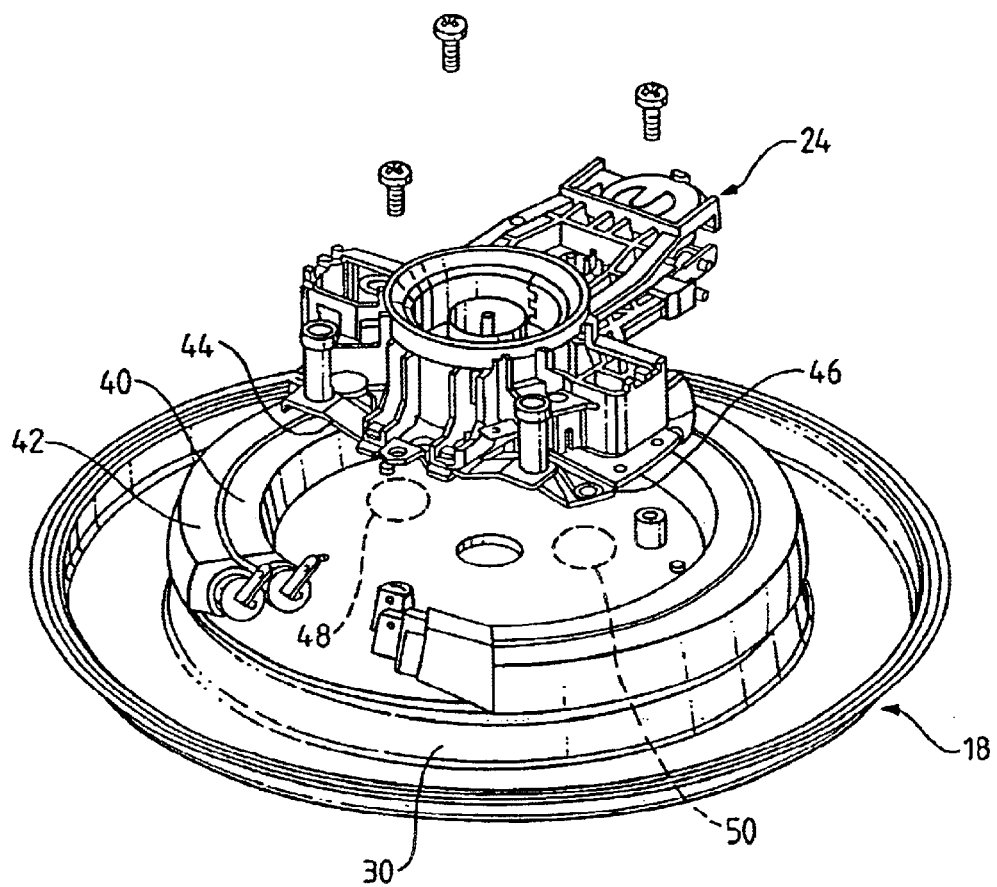
FIG. 4 is view of the assembled components shown in FIG. 3 from the underside of the base.

As shown in more detail in FIGS. 2 to 4, the base 18 is generally planar and comprises a first region 26 which surrounds a central second region 28. The two regions are separated by a circular raised wall 30 which is pressed into the base plate 18. The mouth of the liquid transfer tube 8 opens into the second region 28 of the base.

A substantially planar heat transfer plate 20 is brazed or soldered to the underside of the base, and extends across substantially across the entire surface of the base 18, apart from the very centre of the base 18. The sheathed heating element 22 is generally horseshoed in shape and extends around the periphery of the heat transfer plate 20. The control unit 24 is mounted to the central portion of the heat transfer plate 20 such that it is encircled by the heater 22.

In detail, the sheathed heating element 22 comprises a main heating element 40 and a second, keep-warm, element 42 arranged outwardly, of the main heating element 40. This keep-warm element, preferably has a rating of around 50 watts and it is preferably energised continually after the control 24 operates so as to avoid the-need for thermostatic control. This low wattage can be easily be achieved with a high voltage supply (220–240V) by placing a diode (not shown) in series with the heating element.

Figure 7:
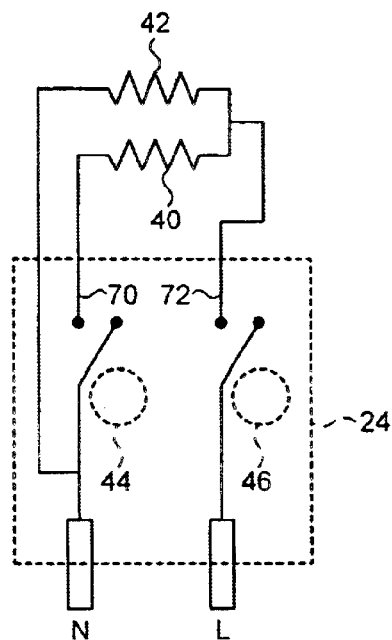
FIG. 7 shows a wiring arrangement for the embodiment of FIGS. 1 to 4.

The heating elements 40, 42 are arranged electrically in parallel as shown in FIG. 7 such that when the appliance is first switched on both elements 40, 42 supply heat to the appliance. The elements 40, 42 share a common line supply through the control 24 and a split neutral side supply, as shown.

The control 24 will be recognised by those skilled in the art as being substantially one of the Applicant's U18 series of controls which are described in WO 95/34187.

The control comprises a pair of snap acting bimetallic actuators 44 and 46 which engage regions 48 and 50 of the heat transfer plate 20 when the control unit 24 is mounted in position. Unlike a standard U18, however, the two actuators operate at different nominal temperatures. In particular, actuators 44 operates nominally at about 135° C. while actuator 46 operates nominally at about 160° C., for purposes which will be described further below. Also, while in a normal U18 operation of either actuator will operate to trip a lever which opens sets of switch contacts in both poles of the supply to the appliance heater, in this embodiment, the trip lever of the control is modified such that when the lower temperature actuator 44 operates, the trip lever opens a set of switch contacts 70 in just one side of the supply to the heating elements 40, 42.

Operation of the appliance described above will now be described.

An infusion, for example coffee, is placed in the upper chamber 6 and water added to the lower chamber 4. The power supply to the heater 22 is switched on and heating of the water in the lower chamber 4 commences. Once the temperature of the water in the lower vessel reaches around 60° C. the pressure in the lower chamber 4 rises sufficiently to start forcing water up the tube 8 through the filter 16 and into the upper chamber 6. After a time, water in the lower chamber 4 begins to boil and the rate of transfer to the upper vessel 6 increases rapidly. The level of the water in the lower chamber 4 then falls until the first region 26 of the base is exposed. Once this region of the base boils dry, the temperature of the heater 22 rises very quickly, a condition which is detected by the actuator 44 of the control unit 24. The actuator 44 trips the trip lever of the control 24 which opens the set of contacts 70 in one side of the power supply to the heating elements 40, 42 so as to switch out the main heating element 40. The keep warm element 42 will remain energised.

A small quantity of liquid will be retained in the second region of the base 28 defined by the raised wall 30. Once the control has operated, heat is transferred from the heater 22 and the first region 26 of the base 12 towards the second region 28 of the base 12 by the heat transfer plate 20, since the second region 28 will be at a lower temperature than the first region 26 and the heater 22 due to the presence of the retained liquid. The continued heating of the retained water in the second region will result in the continued production of vapour to maintain the pressure in the lower chamber 4, preventing the return of the infused liquid from the upper chamber 6 for a short period after the main heating has been discontinued by operation of the control 24.

After a time, once the temperature and hence pressure in the lower chamber 4 has fallen to a certain extent, the steam in the lower chamber 4 begins to condense causing the formation of a vacuum in the lower chamber 4. The infused beverage is then sucked from, the upper chamber 6 through the filter 16 and back into the lower chamber 4 via the tube 8. The upper chamber 6 can then be removed and coffee dispensed from the lower chamber. Since the heat has effectively been sucked out of the first region 26 of the base into the second region 28, the temperature of the first region 26 drops so that the beverage will not boil when it reenters the first region, thereby avoiding any impairment of flavour.

The keep warm element 42 keeps the infused beverage warm. Should the beverage evaporate away, then the base 12 may overheat. Such a condition would be sensed by the higher temperature actuator 46 which would then open a second set of contacts 72 to disconnect the power to the keep warm element 42. This set of contacts 72 will cycle open and closed as the base heats and cools down.

Of course a standard U18 type control could be used, with an alternative wiring arrangement for the elements 40, 42.

Figure 5:
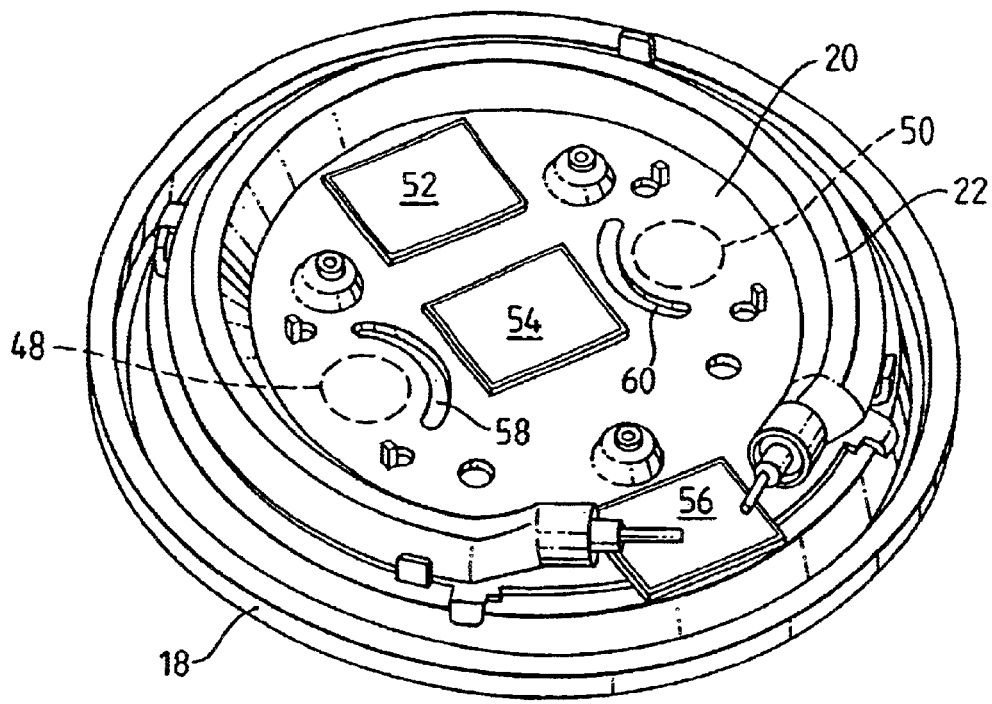
FIG. 5 is a view of an alternative embodiment of the invention.

With reference to FIG. 5, the heat transfer plate 20 may be provided with a plurality of slots 58, 60 as shown in FIG. 5 which surround one or more the mounting locations 48, 50 of the actuators 44 and 46. These slots act to concentrate heat from the element 22 into the locations 48, 50 so that the actuators will primarily responsive to the temperature of the heater 22 in an overheat condition thereby achieving a rapid disconnection of power to prevent additional heat being supplied to the base 18.

FIG. 5 also shows an arrangement in which the keep-warm heating means comprises a plurality of ceramic heaters 52, 54 and 56 mounted against the heat transfer plate 20. This will allow a more even distribution of heat over the base, and reduce the likelihood of localised boiling of the infused beverage. Heaters may be provided in one or more of the positions indicated.

Figure 6:
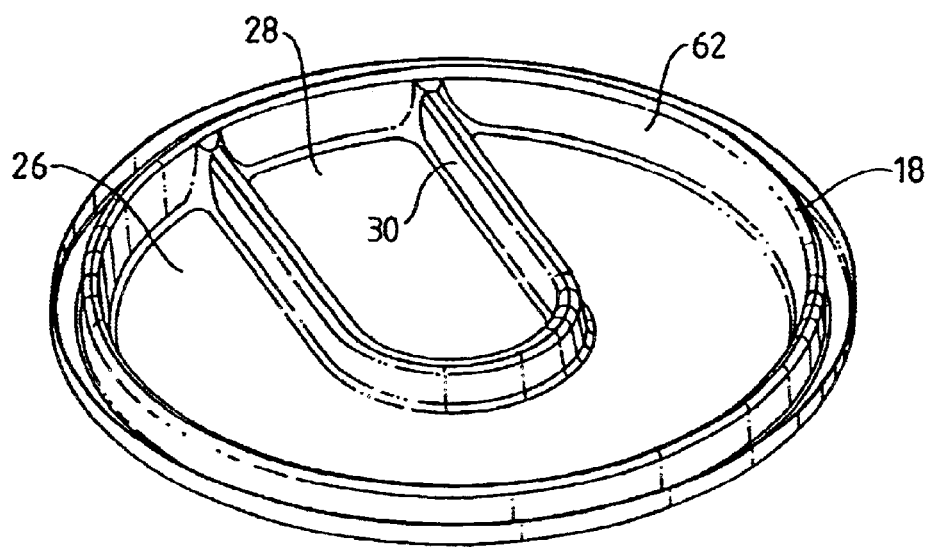
FIG. 6 shows a base in accordance with a further embodiment of the invention.

FIG. 6 shows an alternative embodiment of a base in accordance with the present invention in which the raised wall 30 is generally U-shaped and abuts the wall 62 of the base 18 to define the two regions 26 and 28 of the base.

As previously described, it will be appreciated that the height of the wall 28 and the relative proportions of the base covered by the respective first and second regions will define the amount of liquid which must boil away before the control senses the boiling dry of the first region and acts to discontinue the heating. The most appropriate values for the height of the wall and size of the regions to provide a desired infusion time may be determined empirically.

If desired, a further low powered heater, for example a ceramic heater such heater 54 shown in FIG. 5 may be arranged under the second region of the base, and be energised once the control has operated to discontinue the main heating. The length of time for which the heater is energised will determine the time for which vapour pressure is maintained in the lower vessel, and hence the infusion time of the beverage. A variable infusion time may therefore, be provided by varying the time for which this heater is energised.

Figure 8:
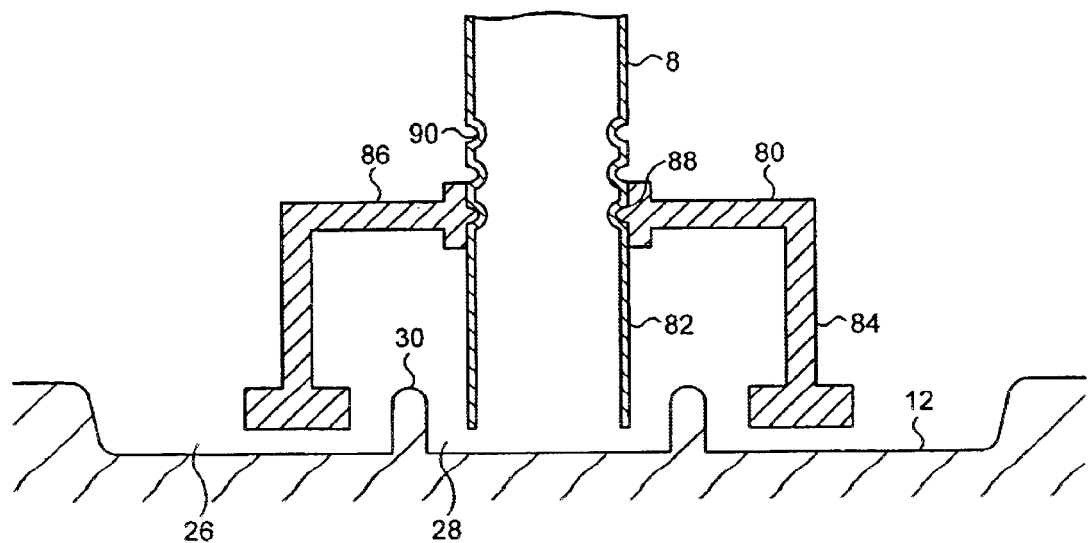
FIG. 8 shows a further arrangement in accordance with the invention.

An alternative arrangement for varying the infusion time is shown schematically in FIG. 8.

In this arrangement, a collar 80 is mounted around the foot 82 of the transfer tube 8. The collar 80 has a depending wall 84 which extends down into the first region 26 of the base 12. The upper wall 86 of the collar 80 includes one or more inward projections 88 which extend into corresponding formations, e.g. grooves 90 provided on the tube 8. The projection 88 may be a continuous ring or a plurality of pips, for example. The tube 8 may be provided with markings indicating the strength of infusion adjacent the formations 90.

The further the collar 80 is moved down the tube 8, the more liquid it displaces from the region 26. As such, when the liquid level drops to the level of the top of the wall 30, the less liquid there is left to evaporate and so the more quickly the region 26 boils dry. In turn, the control 24 operates more quickly to turn off the main heating element 10, and in the absence of further substantial heating the infusion process finishes more quickly.

It will be appreciated that various modifications may be made to the embodiments described above without departing from the scope of the invention. For example, instead of having actuators which operate at different temperatures, the control could have actuators operating at substantially the same temperature. In such an arrangement, the control 24 could be positioned such that one of the actuators is positioned close to the heating elements and the other further away. For example the control could be rotated through 90° from the position shown such that one of the actuators lies adjacent the elements and the other between the cold tails of the elements, where it will not receive as much heat.

In another arrangement there may a completely separate control for the keep warm element 42.

Also, the base 18 and heat transfer member 20 need not be separate members, but could be integrated into a single component, for example a cast component. Also, the sheathed heating element 22 may be cast into a cast heat transfer member 20 which itself is integrated with, or suitably bonded, to the base 18.

What is claimed is:

1. A beverage maker comprising:
   a first chamber;
   a second chamber arranged on top of said first chamber;
   a tube extending down from said second chamber into said first chamber for transferring liquid between the two chambers;
   the base of said first chamber comprising a first region at least a portion of which is arranged to boil dry and a second region which is arranged to retain a quantity of liquid after said first region boils dry, the first region being separated from the second region by a wall;
   the underside of the base of said first chamber being provided with electric heating means comprising one or more sheathed heating elements arranged below said first region of the base and further being provided with a heat transfer member which extends between said first and said second region of the base; and further comprising a thermally sensitive control comprising a thermal sensor arranged to detect when said first region of the base boils dry and to interrupt the power supply to or reduce the heating output of the heating means.

2. A beverage maker as claimed in claim 1 wherein the wall between the two base regions is a raised wall such that liquid may not flow from the first region to the second region.

3. A beverage maker as claimed in claim 1 wherein the second region is defined as a well.

4. A beverage maker as claimed claim 1 wherein the wall defines the two regions alone.

5. A beverage maker as claimed in claim 1 wherein the wall defines the regions together with the walls of the base.

6. A beverage maker as claimed in claim 4 wherein the wall is spaced completely inwardly from the edge of the base.

7. A beverage maker as claimed in claim 6 wherein the first region preferably lies outwardly of and surrounds the second region.

8. A beverage maker as claimed in claim 7 wherein the two regions are provided by an annular wall encircling is the central portion of the base to define the second region.

9. A beverage maker as claimed in claim 1 wherein the lower end of the transfer tube opens into the second region of the base.

10. A beverage maker as claimed in claim 1 wherein the heat transfer member extends over a substantial area of the base.

11. A beverage maker as claimed in claim 1 wherein the heat transfer member extends over substantially the entire first region.

12. A beverage maker as claimed in claim 1 wherein the heat transfer member comprises a plate which is attached to the base.

13. A beverage maker as claimed in claim 1 wherein said heat transfer member and said base are integrated in a single component.

14. A beverage maker as claimed in claim 13 wherein the component is a die cast component, the heating element being embedded or cast into the component.

15. A beverage maker as claimed in claim 1 wherein the sheathed heating element is mounted to the heat transfer member.

16. A beverage maker as claimed in claim 15 wherein the heating element extends around the periphery of the heat transfer member.

17. A beverage maker as claimed in claim 1 wherein the thermal sensor of the control comprises a bimetallic actuator arranged in good thermal contact with the heat transfer member.

18. A beverage maker as claimed in claim 17 comprising a pair of spaced apart actuators.

19. A beverage maker as claimed in claim 17 wherein the thermal sensor is arranged to be close to the heating element.

20. A beverage maker as claimed in claim 1 wherein the heat transfer member is provided with heat flow management means around the mounting location for the sensor such that the sensor is heated preferentially by the heater.

21. A beverage maker as claimed in claim 20 wherein said heat flow management means comprise one or more grooves or slots provided around selected portions of the mounting location away from the heater.

22. A beverage maker as claimed in claim 1 further comprising means to keep the infused beverage warm once it has returned to the first chamber.

23. A beverage maker as claimed in claim 22 wherein the keep warm heating means comprises an additional sheathed element.

24. A beverage maker as claimed in claim 23 wherein the main heating element is mounted to the periphery of the base, and the keep warm element comprises a second element arranged concentrically with the main heating element.

25. A beverage maker as claimed in claim 22 wherein the keep warm heating means comprises a thick film type heater.

26. A beverage maker as claimed in claim 25, comprising a plurality of heaters provided at spaced locations across the base of the first chamber.

27. A beverage maker as claimed in claim 22 comprising two apart sensors, one of which is arranged to sense boiling dry of the first region in order to switch out or down the main heating element, while the other is arranged to sense severe overheating of the base and thereafter de-energise the keep warm heating means.

28. A beverage maker as claimed in claim 27 wherein one sensor is positioned at different spacings from the heating element.

29. A beverage maker as claimed in claim 27 wherein the sensors have different operating temperatures.

30. A beverage maker having main heating means and keep warm heating means comprising a control having a first actuator for sensing boiling dry of a region of the beverage maker and thereupon discontinuing or reducing the power supply to the main heating means, and a second actuator arranged to sense severe overheating of the beverage maker and thereupon also discontinuing or reducing the power supply to the keep warm heating means.

31. A beverage maker as claimed in claim 1 further comprising means to vary the infusion time of the beverage.

32. A beverage maker as claimed in claim 31 comprising a displacement member which is movable into the first region by varying amounts to displace varying amounts of water.

33. A beverage maker comprising:
 a first chamber;
 a second chamber arranged on top of said first chamber;
 a tube extending down from said second chamber into said first chamber for transferring liquid between the two chambers;
 the base of said first chamber comprising a first region at least a portion of which is arranged to boil dry in use;
 and further comprising a displacement device displaceable into said first region so to displace water therefrom.

34. A beverage maker as claimed in claim 33 wherein the displaceable member is mounted on the transfer tube.

35. A beverage maker as claimed in claim 34 wherein the displaceable member comprises a collar mounted around the transfer tube.

36. A beverage maker as claimed in claim 35 wherein means are provided on the tube and/or collar to retain the collar in one or more desired positions.

37. A beverage maker as claimed in claim 36 wherein said collar clips or screws onto the tube.

* * * * *